United States Patent
Adams (10) Patent No.: US 7,408,992 B2
(45) Date of Patent: Aug. 5, 2008

(54) DETECTION AND REPAIR OF MPEG-2 CHROMA UPCONVERSION ARTIFACTS

(75) Inventor: Dale R. Adams, San Jose, CA (US)

(73) Assignee: Silicon Image, Inc., Sunnyvale, CA (US)

(*) Notice: Subject to any disclaimer, the term of this patent is extended or adjusted under 35 U.S.C. 154(b) by 775 days.

(21) Appl. No.: 10/663,413

(22) Filed: Sep. 15, 2003

(65) Prior Publication Data
US 2004/0057467 A1 Mar. 25, 2004

Related U.S. Application Data

(60) Provisional application No. 60/413,220, filed on Sep. 23, 2002.

(51) Int. Cl.
*H04N 7/12* (2006.01)
*H04N 11/20* (2006.01)

(52) U.S. Cl. .................. 375/240.27; 348/450; 348/666

(58) Field of Classification Search ................ 348/450, 348/666; 382/260, 264, 275; 375/240.27, 375/240.01
See application file for complete search history.

(56) References Cited

U.S. PATENT DOCUMENTS 5,684,544 A * 11/1997 Astle ........................ 348/708
5,712,687 A 1/1998 Naveen et al.
5,844,617 A * 12/1998 Faroudja et al. ............. 348/441
6,108,041 A 8/2000 Faroudja et al.
6,462,788 B1 10/2002 Tan et al.
2004/0008790 A1* 1/2004 Rodriguez ............. 375/240.26

FOREIGN PATENT DOCUMENTS

| EP | 0 595 323 A2 | 4/1994 |
|---|---|---|
| EP | 0 918 436 | 5/1999 |
| WO | WO 00/49809 | 8/2000 |

OTHER PUBLICATIONS

'DVD Benchmark-Special Report- The CHroma Upsampling Error in DVD Players-Apr. 2001' by Don Munsil and Stacey Spears; Apr. 14, 2001; http://web.archive.org/web/20020202160451/http://www.hometheaterhifi.com/volume_8_2/dvd-benchmark-special-report-chroma-bug-4-2001.html.*

* cited by examiner

*Primary Examiner*—Gims S. Philippe
*Assistant Examiner*—Erick Rekstad
(74) *Attorney, Agent, or Firm*—Perkins Coie LLP (57) ABSTRACT

A method for removing MPEG-2 chroma upconversion artifacts in a video stream includes detecting a presence of artifacts in an incorrectly upsampled MPEG-2 video stream and removing the presence of artifacts resulting in an artifact free video stream.

12 Claims, 6 Drawing Sheets

DETECTION AND REPAIR OF MPEG-2 CHROMA UPCONVERSION ARTIFACTS

CROSS REFERENCE TO RELATED APPLICATIONS

This application claims the benefits of co-pending U.S. Patent Provisional Application No. 60/413,220 filed on Sep. 23, 2002, and is incorporated herein by reference.

BACKGROUND OF THE INVENTION

1. Field of the Invention

The present invention relates generally to the processing of video images, and more particularly to techniques for deinterlacing video images.

2. Description of the Related Art

MPEG-2 makes use of a chroma-to-luma sampling relationship known as 4:2:0, in which two color-difference signals are sampled at one half the rate of luma in both the vertical and horizontal directions. An MPEG-2 decoder typically produces an output signal in the 4:2:2 format in which the color signals are sampled at one half the luma rate in only the horizontal direction. The MPEG decoder must therefore upsample the 4:2:0 encoded data in the vertical direction to produce the desired 4:2:2 output. In addition, MPEG-2 video sequences may be encoded as either a progressive or interlaced image sequence. A problem occurs when an image actually encoded as progressive is decoded as interlaced for the purposes of the chroma upsampling. In this case, the chroma samples are incorrectly upconverted and positioned relative to the corresponding luma samples, resulting in artifacts in areas of vertical color transitions.

MPEG-2 compression is in common use in today's digital video systems. Since MPEG-2 is a digital video compression method, the video signal must be digitally sampled prior to being compressed. The sampled digital video signal is composed of three components: a luminance (aka, 'luma') signal which contains brightness information but no color, and two color or chrominance (aka, 'chroma') signals which are a scaled version of the difference between red and luma and between blue and luma (aka, 'R—Y' or 'Cr', and 'B—Y' or 'Cb', respectively). Inherent in the MPEG-2 encoding is a relationship between the sampling rates and the relative spatial positioning of these luma and chroma samples.

While the MPEG-2 standard supports a variety of signal formats and resolutions, the common type in use today for standard definition video signals uses a luma/chroma sampling relationship known as 4:2:0. This standard dictates that the two chroma signals are sampled at half the rate of the luma signal in both the vertical and horizontal directions—i.e., each of the two chroma signals has one quarter the bandwidth of the luma signal. A chroma sample is spatially positioned halfway between a pair of luma samples in the vertical direction, and may be either halfway between a pair of luma samples in the horizontal direction or may be coincident with one of the two luma samples. It is only the vertical relationship which is at issue here.

Even though MPEG-2 video data is in the 4:2:0 format, most MPEG-2 decoders produce a digital video output which is in the 4:2:2 format. With 4:2:2, the chroma data is sampled at half the luma rate in only the horizontal direction. There is one of each type of chroma sample—Cr and Cb—for each luma sample in the vertical direction. Because of this difference in the input and output sampling rates for chroma, an MPEG-2 decoder must 'upconvert' or 'upsample' the chroma signals vertically to produce an output in the 4:2:2 format.

Various techniques can be used for this upconversion process, and range from simple replication of one chroma sample over two luma samples, to linear interpolation, to more sophisticated sample rate conversion using digital FIR filters.

One other key aspect of MPEG-2 is that the compressed video can be in either progressive or interlaced format. Although the vast majority of MPEG-2 decoders output video in the interlaced format, the original video signal could have been compressed in either of the progressive or interlaced formats, depending on the source's characteristics. Control flags within the MPEG-2 data stream indicate which format was used for each video frame. It is important to note that if a given video signal has been compressed in one format, it must also be decoded in that same format or there can be problems with the positioning of decoded luma and chroma samples relative to each other.

Figure 1:
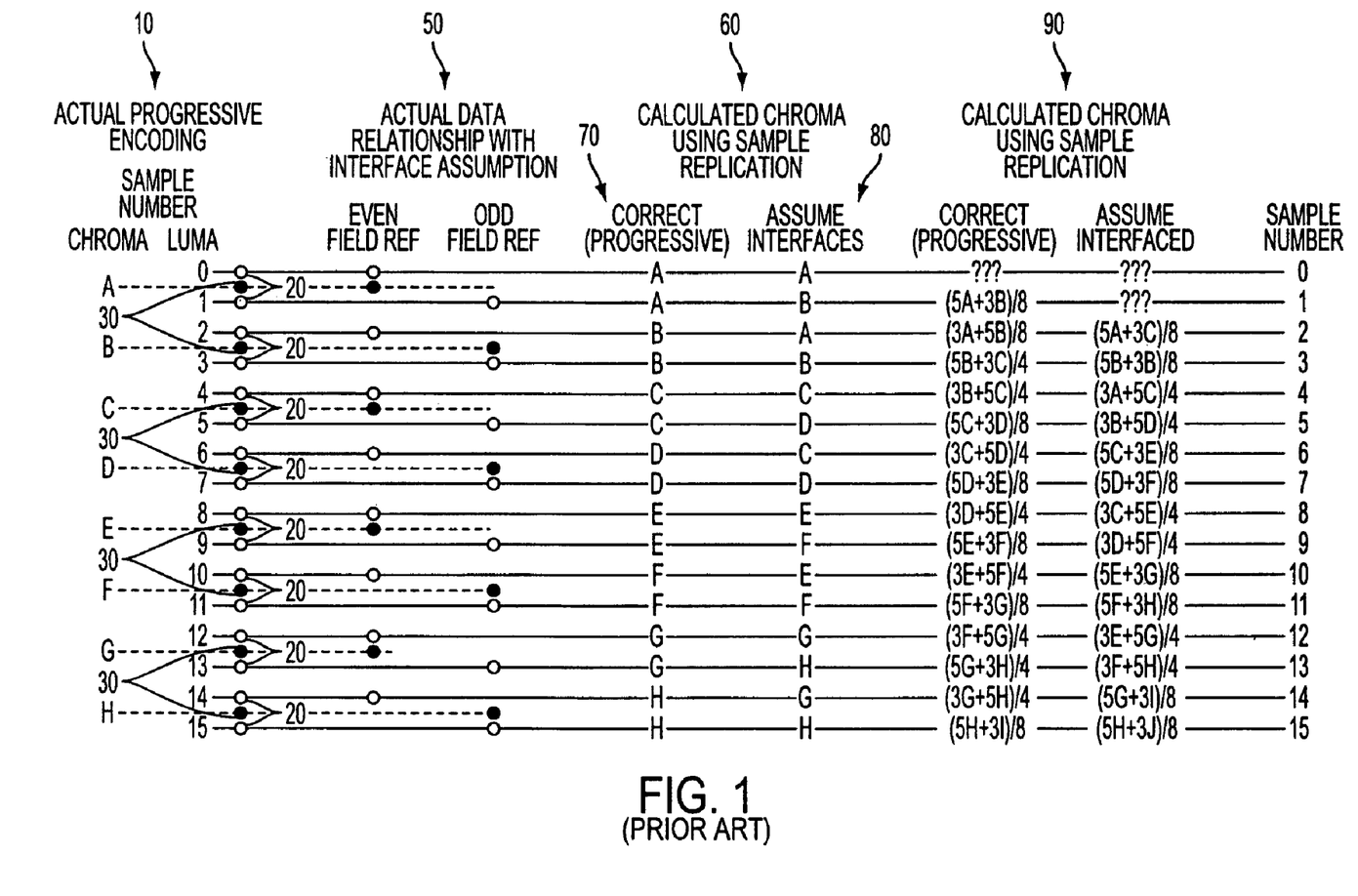
FIG. 1 illustrates the MPEG-2 decoder chroma upsampling problem of the prior art.

FIG. 1 illustrates what can happen when a video frame of the prior art encoded as progressive is treated as interlaced. The leftmost column 10 indicates a single column of video samples (the horizontal dimension is ignored for the purposes of this discussion) which has been encoded as progressive. For each pair of luma samples 20, represented by the open circles and numbered from zero at the top of the column in increasing order towards the bottom of the column, there is a single chroma sample 30 (note that only one chroma sample 30 per luma pair 20 is shown—there is actually a pair of chroma samples, Cr and Cb located halfway between the luma pair 20. The chroma samples have been designated with letters, starting with 'A' and progressing vertically downwards.

The second column 50 indicates the luma/chroma relationship for images encoded as interlaced. Note that the chroma samples for an interlaced image are not spatially located at equidistant from the luma samples as the chroma samples for a progressive image. The actual chroma samples from the progressive image are derived from an even/odd line pair, not an even/even or odd/odd line pair as for an interlaced image. Even worse, when the chroma samples are vertically upsampled to form the 4:2:2 output, half of the original chroma samples are missing from each of the two fields and the upconversion is performed twice on only half the data. This results in a distortion of the image. This distortion is especially apparent when the interlaced output fields of the MPEG-2 decoder are combined back into the original progressive image by an interlaced-to-progressive video format converter.

The effects of this distortion are shown in the remaining columns in FIG. 1. The third column 60 indicates what takes place when simple sample replication is used to perform the vertical chroma upconversion. The left set of upconverted values 70 are the correct ones based on the original progressive encoding. The right set of upconverted values 80 are those derived from improperly interpreting the video frame as interlaced. Note that the ordering of the 'interlaced' chroma upconverted samples actually reverses direction every few samples, resulting in a periodic retrograde sequence. This reversal can result in visible artifacts in the region of vertical chroma transitions such as the border between two objects of different colors. These artifacts somewhat resemble interlace motion artifacts, which is reasonable since they stem from an interlaced scan ordering. The fourth column 90 indicates the same relationship, but assumes that linear interpolation has been used for the upconversion process instead of sample replication. Again, the ordering of the 'interlaced' upconverted chroma samples indicates the periodic retrograde sequence which results in visible artifacts.

Accordingly, what is needed is a method and system that detects and repairs video image distortion caused by incorrect decoding of MPEG-2 images.

SUMMARY OF THE INVENTION

The present invention meets these needs by being utilized inside of an interlace-to-progressive scan converter, and identifies and repairs interlaced video input streams with this problem in the process of converting them to a progressively scanned output signal. The problem addressed by the present invention is that of video encoded as progressive being treated as interlaced for the purposes of the chroma upconversion from 4:2:0 to 4:2:2. It should be appreciated that the present invention and various discreet features thereof can be implemented in numerous ways, including as a process, an apparatus, a system, a device, or a method. Furthermore, various discrete apparatus of the invention can be implemented in software or hardware. Several inventive embodiments of the present invention are described below.

In one embodiment of the present invention, a method for removing MPEG-2 chroma upconversion artifacts in a video stream is disclosed. The method includes detecting a presence of artifacts in an incorrectly upsampled MPEG-2 video stream and removing the presence of artifacts resulting in an artifact free video stream.

In another embodiment of the present invention, a video system for producing a corrected progressive MPEG-2 output from an MPEG-2 compressed video source includes an MPEG-2 compressed video source, a progressive MPEG2 decoder having an input coupled to an output of the an MPEG-2 compressed video source, a buffer having an input coupled to an output of the progressive MPEG-2 decoder, a video processing module having an input coupled to an output of the buffer, and a progressive display having an input coupled to an output of the video processing module.

In yet another embodiment of the present invention, a video system for producing a corrected progressive MPEG-2 output from an MPEG-2 compressed video source includes an interlaced MPEG-2 decoder with an input coupled to an output of the MPEG-2 compressed video source, a deinterlacer with an input coupled to an output of the interlaced MPEG-2 decoder, a buffer with an input coupled to an output of the deinterlacer, a video processing module with an input coupled to an output of the buffer, and a progressive display with an input coupled to an output of the video processing module. The video processing module contains the previously described invention for detection and repair of MPEG-2 chroma upconversion artifacts.

In a final embodiment of the present invention, a video system for producing a corrected progressive MPEG-2 output from an MPEG-2 compressed video source includes an MPEG-2 compressed video source, an interlaced MPEG2 decoder with an input coupled to an output of the MPEG-2 compressed video source, a buffer with an input coupled to an output of interlaced MPEG-2 decoder, a deinterlacer/video processing module with an input coupled to an output of the buffer, and a progressive display with an input coupled to an output of the video processing module.

BRIEF DESCRIPTION OF THE DRAWINGS

The present invention will be readily understood by the following detailed description in conjunction with the accompanying drawings wherein.

DETAILED DESCRIPTION OF THE PREFERRED EMBODIMENTS

FIG. 1 was previously described in relation to the prior art.

Figure 2:
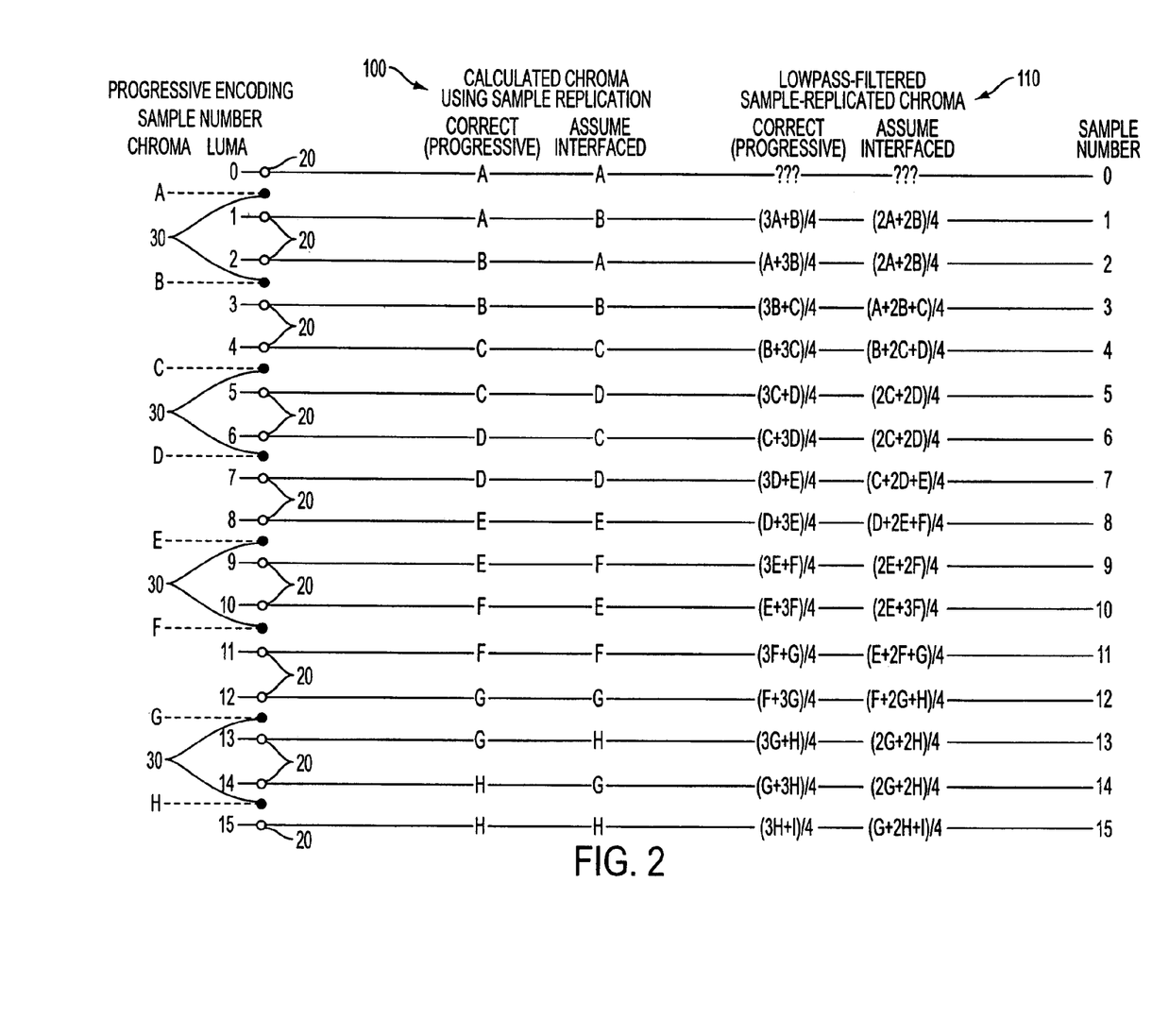
FIG. 2 illustrates a way to remove or reduce the primary negative effects of interlaced chroma upconversion of progressive images, in accordance with the present invention.

FIG. 2 illustrates a way to remove or reduce the primary negative effects of interlaced chroma upconversion of progressive images. The calculated chroma column 100 is the same as the calculated chroma column 60 from FIG. 1 for upconversion by simple replication of chroma samples. The third column 110 of FIG. 2 illustrates what happens when a simple vertical lowpass filter is used on the chroma data. The lowpass filter shown is calculated in the following manner as shown in equation 1, where '$S_N$' is the chroma sample at line 'N':

$$\text{Lowpass filtered } S_N = (S_{N-1} + 2 \cdot S_N + S_{N+1})/4 \quad \text{Equation 1}$$

For the interlaced upconversion, the lowpass filtering operation removes the direction reversal which occurs in the unfiltered upconversion. While the simple lowpass filter described above can be used to reduce or correct this problem, it should also be noted that other types of lowpass filters could be used, including simple averaging through more sophisticated FIR filters.

Detection of the Problem

Figure 3:
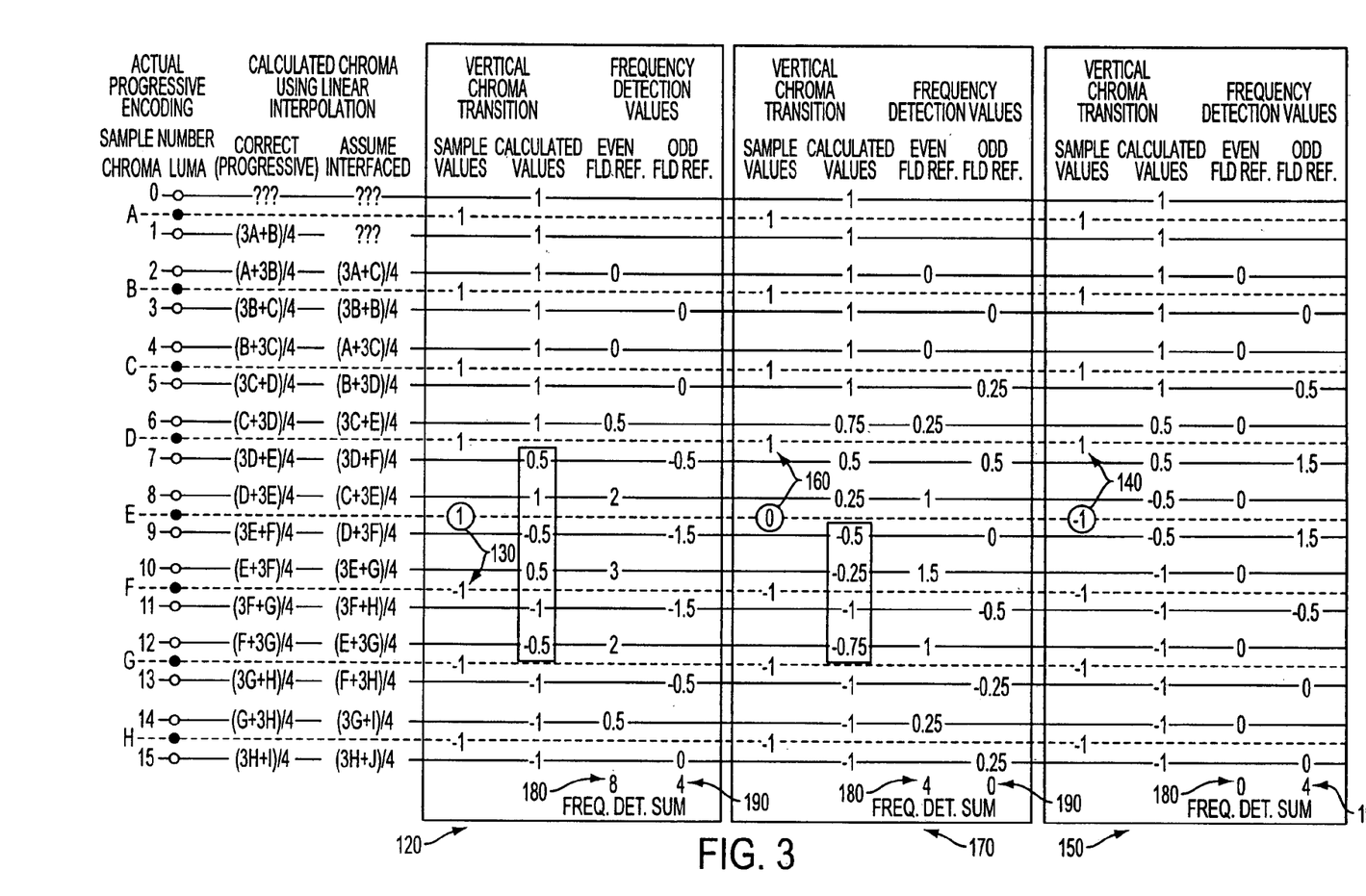
FIG. 3 illustrates a method for detecting MPEG-2 decoder interlace chroma upsampling artifacts, in accordance with the present invention.

Although the lowpass filter correction method described above could be applied to all decoded video signals, it is preferable to apply it only to video signals which actually have had incorrect upsampling performed. This requires that there be a means to detect when the faulty upconversion has been performed. Such a detection means is illustrated in FIG. 3. The detection method is based on the vertical frequency detection technique described in the DVDO patent application titled "Method and Apparatus for Detecting Frequency in Digital Video Images", U.S. patent application Ser. No. 09/372,713, previously incorporated by reference. In particular, a partial DFT is performed on four vertically aligned chroma samples to detect the specific frequency associated with interlace artifacts. In addition, the partial DFT is performed twice, once with an even numbered line as the reference point and once with an adjacent odd numbered line as the reference point.

This is illustrated in FIG. 3 for three different cases 120, 150 and 170 (indicated by the large boxed-in areas) which are characteristic of a moving vertical chroma transition. Such a transition can occur in either a video sequence with a moving vertical edge, or for horizontally adjacent pixels in a static image with a diagonal vertical chroma transition. The key to the detection method is that the even and odd referenced partial DFTs yield very different results depending on the alignment of the chroma transition relative to even and odd lines.

This is shown in FIG. 3 for the three cases. In the first case 120, a sharp chroma transition 130 occurs between chroma samples E and F. In the next two cases, the chroma transition 140 moves up until it occurs between samples D and E in the third case 150, with the chroma transition 160 for the second case 170 being halfway between the first 120 and third 150. Partial DFTs, also called frequency detection values, are computed for each line, and the absolute value of the frequency detection values are summed for all the even lines 180 and separately for all the odd lines 190. In all three cases there is a significant difference between the even 180 and odd line sums 190. As the vertical chroma transition moves upward in the three cases of FIG. 3, it can be seen that the even 180 and odd line sums 190 change from the even being largest to the odd being largest.

It is this difference between even and odd frequency detection values that forms the basis of the detection mechanism. For video sources with the chroma upconversion problem in the neighborhood of a vertical chroma transition, when the even line frequency detection value is high, the odd is typically low, and vice versa. Video sources which do not have the incorrectly upconverted chroma tend not to show this even/odd difference at all, or at least to a much, much lesser degree. This difference can be used to distinguish between frequency detection values for sources with upconversion problems and those with properly upconverted chroma.

The detection scheme of the present invention takes the absolute value of the difference of the values of the even and odd line referenced frequency detection values for each pixel location in the current video field. These difference magnitudes are then summed over the entire field. Since the even and odd frequency detection values are typically different for a problem source, a relatively large sum results. The same process is then performed on the same chroma video data, but with a vertical lowpass filter operation performed on the chroma data first. As described in the previous section, the lowpass filter removes the artifacts associated with the incorrect chroma upconversion. Since the even and odd frequency detection values for the lowpass filtered data tend to be very similar, the field sum is relatively low.

This detection scheme applied to a video signal without the chroma upconversion problem yields two frequency detection sums which are very similar to each other since neither the original video data nor the lowpass filtered data has the upconversion problem. However, the two frequency detection sums derived from a video signal which does have the chroma upconversion problem yields sums which are very different from each other. This difference is typically greater than 10 to 1, and provides a clear differentiating factor which can be used to identify video sources with this problem. Once a problem source has been identified, the chroma upconversion artifacts can be removed with a vertical lowpass filter.

Figure 4:
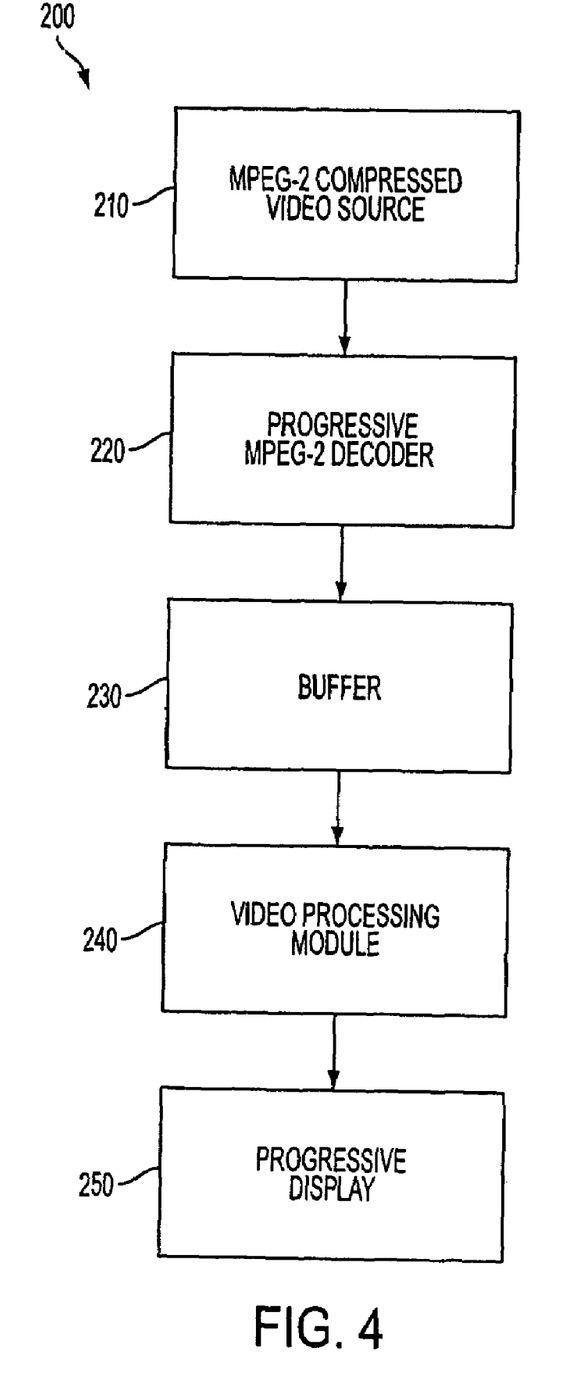
FIG. 4 illustrates a video system in which an MPEG-2 compressed video source produces a corrected progressive MPEG-2 output, in accordance with an embodiment of the present invention.

FIG. 4 illustrates a video system 200 in which an MPEG-2 compressed video source produces a corrected progressive MPEG-2 output, in accordance with an embodiment of the present invention. The system includes an MPEG-2 compressed video source 210, a progressive MPEG-2 decoder 220 having an input coupled to an output of the an MPEG-2 compressed video source 210, a buffer 230 having an input coupled to an output of the progressive MPEG-2 decoder 220, a video processing module 240 having an input coupled to an output of the buffer 240, and a progressive display 250 having an input coupled to an output of the video processing module 250. The video processing module 240 contains the previously described invention for detection and repair of MPEG-2 chroma upconversion artifacts.

Figure 5:
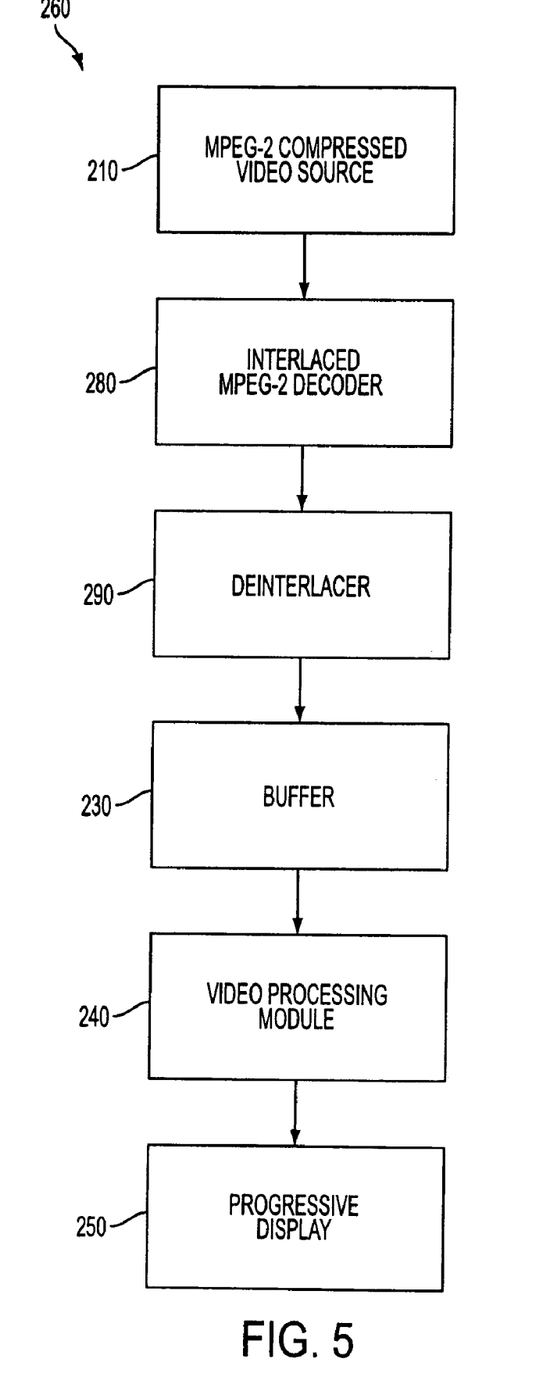
FIG. 5 illustrates a video system in which an MPEG-2 compressed video source produces a corrected progressive MPEG-2 output, in accordance with an embodiment of the present invention.

FIG. 5 illustrates a video system 260 in which an MPEG-2 compressed video source produces a corrected progressive MPEG-2 output, in accordance with an embodiment of the present invention. The system includes an MPEG-2 compressed video source 210, an interlaced MPEG-2 decoder 280 with an input coupled to an output of the MPEG-2 compressed video source 210, a deinterlacer 290 with an input coupled to an output of the interlaced MPEG-2 decoder 280, a buffer 230 with an input coupled to an output of the deinterlacer 290, a video processing module 240 with an input coupled to an output of the buffer 230, and a progressive display with an input coupled to an output of the video processing module 240. The video processing module 240 contains the previously described invention for detection and repair of MPEG-2 chroma upconversion artifacts.

Figure 6:
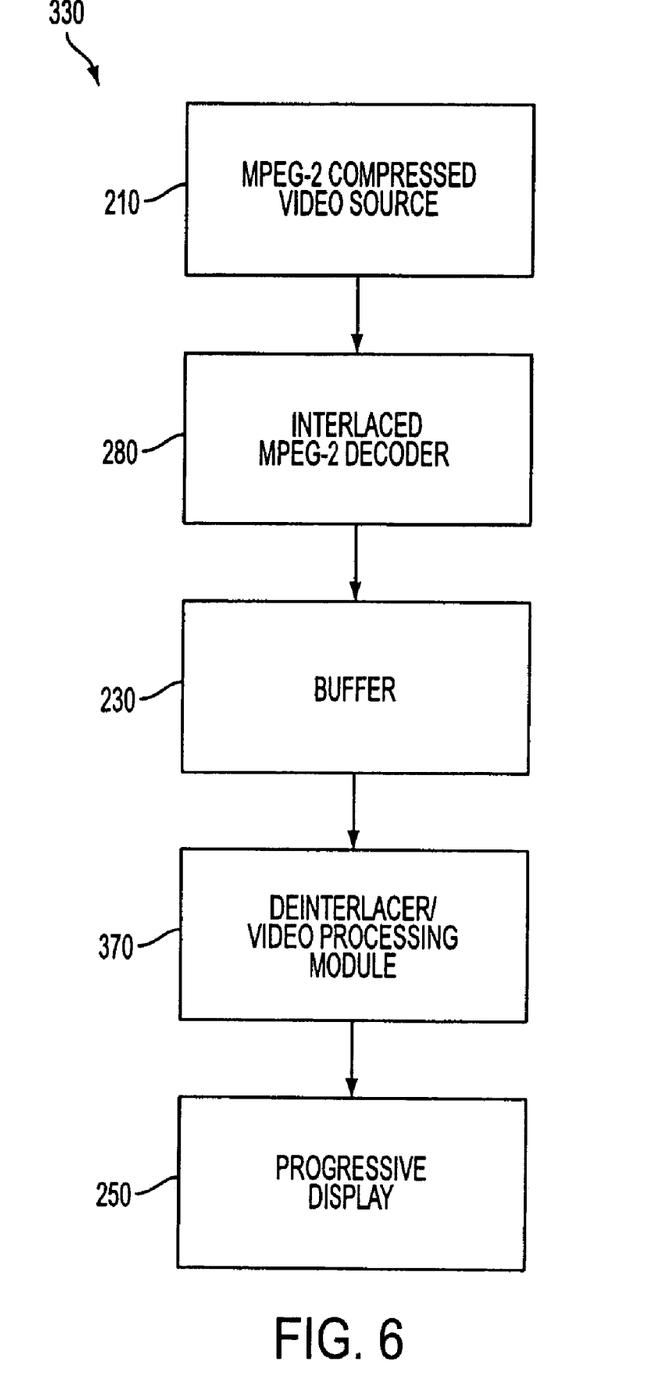
FIG. 6 illustrates a video system in which an MPEG-2 compressed video source produces a corrected progressive MPEG-2 output, in accordance with an embodiment of the present invention.

FIG. 6 illustrates a video system 330 in which an MPEG-2 compressed video source produces a corrected progressive MPEG-2 output, in accordance with an embodiment of the present invention. The system includes an MPEG-2 compressed video source 210, an interlaced MPEG-2 decoder 280 with an input coupled to an output of the MPEG-2 compressed video source 210, a buffer 230 with an input coupled to an output of interlaced MPEG-2 decoder 280, a deinterlacer/video processing module 370 with an input coupled to an output of the buffer 230, and a progressive display 250 with an input coupled to an output of the video processing module 370. The video processing module 370 contains the previously described invention for detection and repair of MPEG-2 chroma upconversion artifacts and a deinterlacer.

This embodiment has several advantages over the system 260 as shown in FIG. 5. Since much of what is needed to implement the present invention is available in a deinterlacer, the two modules can be easily merged and results in a more economical system to manufacture. Additionally, one less frame period of delay is realized in the system 330 since a separate implementation of the present invention incurs a single-frame period of delay in analyzing the video data.

While this invention has been described in terms of several preferred embodiments, it will be appreciated that those skilled in the art, upon reading the preceding specifications and studying the drawings, will realize various alterations, additions, permutations, and equivalents as fall within the true spirit and scope of the invention.

What is claimed is:

1. A method for removing MPEG-2 chroma upconversion artifacts in a video stream comprising:
   detecting a presence of artifacts in an incorrectly upsampled MPEG-2 video stream based on a difference between even line and odd line frequency detection values of the video stream, wherein said frequency detection values are obtained by performing a partial DFT (Discrete Fourier Transform) on chroma data and using the transformed chroma data in the frequency domain; and
   removing the presence of artifacts resulting in an artifact free video stream.

2. A method for removing MPEG-2 chroma upconversion artifacts in a video stream comprising
   detecting a presence of artifacts in an incorrectly upsampled MPEG-2 video stream, comprising the steps of:
      obtaining a first set of frequency detection values for a chroma component of a plurality of pixels from a plurality of even numbered rows;
      obtaining a first set of vertically lowpass filtered frequency detection values for a chroma component of a plurality of pixels from a plurality of even numbered rows;
      obtaining a second set of frequency detection values for a chroma component of a plurality of pixels from a plurality of odd numbered rows;
      obtaining a second set of vertically lowpass filtered frequency detection values for a chroma component of a plurality of pixels from a plurality of odd numbered rows;

calculating a first sum of an absolute value of the first set of frequency detection values;

calculating a first sum of an absolute value of the first set of vertically lowpass filtered frequency detection values;

calculating a second sum of an absolute value of the second set of frequency detection values;

calculating a second sum of an absolute value of the second set of vertically lowpass filtered frequency detection values;

calculating a first absolute value difference between the first sum of the absolute value of the first set of frequency detection values and the second sum of the absolute value of the second set of frequency detection values;

calculating a second absolute value difference between the first sum of the absolute value of the first set of vertically lowpass filtered frequency detection values and the a second sum of an absolute value of the second set of vertically lowpass filtered frequency detection values; and confirming the presence of artifacts if a ratio between the first absolute value difference and the second absolute value difference is larger than about a threshold; and removing the presence of artifacts resulting in an artifact free video stream.

3. The method of claim 2 wherein the threshold is 10.

4. The method of claim 2 wherein the first and second sets of frequency detection values and the first and second sets of lowpass filtered frequency detection values are obtained by performing a partial discrete fourier transform on a set of vertically aligned chroma data samples.

5. The method of claim 1 wherein removing the presence of artifacts comprises lowpass filtering a set of chroma data.

6. The method of claim 5 wherein the lowpass filtering of the set of chroma data comprises:

doubling a current chroma data sample to be filtered;

adding a row above chroma data sample from directly above the current chroma sample;

adding a row below chroma data sample from directly below the current chroma sample; and dividing by 4.

7. A method for removing chroma upconversion artifacts in a video stream comprising:

determining a difference between even line and odd line frequency detection values of the video stream, wherein said frequency detection values are obtained by performing a partial DFT (Discrete Fourier Transform) on chroma data and using the transformed chroma data in the frequency domain;

detecting a presence of artifacts in an upsampled video stream based on the determined difference; and removing the presence of artifacts resulting in an artifact free video stream.

8. A method for removing chroma upconversion artifacts in a video stream comprising:

determining a difference between even line and odd line frequency detection values of the video stream;

detecting a presence of artifacts in an upsampled video stream based on the determined difference; and removing the presence of artifacts resulting in an artifact free video stream;

wherein the detecting a presence of artifacts in an upsampled video stream further comprises:

calculating a first sum of an absolute value of a first set of frequency detection values and a second sum of an absolute value of a first set of vertically lowpass filtered frequency detection values for a chroma component of a plurality of pixels from a plurality of even numbered rows;

calculating a third sum of an absolute value of a second set of frequency detection values and a fourth sum of an absolute value of a second set of vertically lowpass filtered frequency detection values for a chroma component of a plurality of pixels from a plurality of odd numbered rows;

calculating a first absolute value difference between the first sum and the third sum and a second absolute value difference between the second sum and the a fourth sum; and confirming the presence of artifacts if a ratio between the first absolute value difference and the second absolute value is within a magnitude relationship of an identified threshold.

9. The method of claim 8, wherein the chroma upconversion artifacts comprise MPEG-2 chroma upconversion artifacts.

10. An apparatus for removing chroma upconversion artifacts in a video stream comprising:

means for determining a difference between even line and odd line frequency detection values of the video stream, wherein said frequency detection values are obtained by performing a partial DFT (Discrete Fourier Transform) on chroma data and using the transformed chroma data in the frequency domain;

means for detecting a presence of artifacts in an upsampled video stream based on a the determined difference; and means for removing the presence of artifacts resulting in an artifact free video stream.

11. An apparatus for removing chroma upconversion artifacts in a video stream comprising;

means for determining a difference between even line and odd line frequency detection values of the video stream;

means for detecting a presence of artifacts in an upsampled video stream based on a the determined difference; and means for removing the presence of artifacts resulting in an artifact free video stream;

wherein the means for detecting a presence of artifacts in an upsampled video stream further comprises:

means for calculating a first sum of an absolute value of a first set of frequency detection values and a second sum of an absolute value of a first set of vertically lowpass filtered frequency detection values for a chroma component of a plurality of pixels from a plurality of even numbered rows;

means for calculating a third sum of an absolute value of a second set of frequency detection values and a fourth sum of an absolute value of a second set of vertically lowpass filtered frequency detection values for a chroma component of a plurality of pixels from a plurality of odd numbered rows;

means for calculating a first absolute value difference between the first sum and the third sum and a second absolute value difference between the second sum and the a fourth sum; and means for confirming the presence of artifacts if a ratio between the first absolute value difference and the second absolute value is within a magnitude relationship of an identified threshold.

12. The apparatus of claim 11, wherein the chroma upconversion artifacts comprise MPEG-2 chroma upconversion artifacts.

* * * * *